(12) United States Patent
Lummerstorfer et al.

(10) Patent No.: US 11,674,025 B2
(45) Date of Patent: *Jun. 13, 2023

(54) FIBER REINFORCED POLYPROPYLENE COMPOSITE

(71) Applicant: BOREALIS AG, Vienna (AT)

(72) Inventors: Thomas Lummerstorfer, Gramastetten (AT); Michael Jerabek, Leonding (AT); Stefan Hochradi, Linz (AT); Claudia Pretschuh, Leonding (AT); Karoly Renner, Gyorzamoly (HU); Lukas Sobczak, Linz (AT); Wolfgang Stockreiter, Puchenau (AT); Bela Pukanszky, Budapest (HU); Janos Moczo, Budapest (HU)

(73) Assignee: BOREALIS AG, Vienna (AT)

( * ) Notice: Subject to any disclaimer, the term of this patent is extended or adjusted under 35 U.S.C. 154(b) by 265 days.

This patent is subject to a terminal disclaimer.

(21) Appl. No.: 16/866,729

(22) Filed: May 5, 2020

(65) Prior Publication Data

US 2020/0263017 A1 Aug. 20, 2020

Related U.S. Application Data

(63) Continuation of application No. 16/338,127, filed as application No. PCT/EP2017/076283 on Oct. 16, 2017, now Pat. No. 10,752,762.

(30) Foreign Application Priority Data

Oct. 17, 2016 (EP) .................................... 16194175

(51) Int. Cl.
| | |
|---|---|
| *C08L 23/10* | (2006.01) |
| *C08L 23/12* | (2006.01) |
| *B29B 15/12* | (2006.01) |
| *B29C 45/00* | (2006.01) |
| *C08J 3/22* | (2006.01) |
| *C08J 5/04* | (2006.01) |
| *B29K 23/00* | (2006.01) |
| *B29K 307/04* | (2006.01) |
| *B29K 309/08* | (2006.01) |

(52) U.S. Cl.
CPC .............. *C08L 23/12* (2013.01); *B29B 15/12* (2013.01); *B29C 45/0005* (2013.01); *C08J 3/226* (2013.01); *C08J 5/042* (2013.01); *C08J 5/043* (2013.01); *B29K 2023/12* (2013.01); *B29K 2307/04* (2013.01); *B29K 2309/08* (2013.01); *C08J 2323/12* (2013.01); *C08J 2423/30* (2013.01); *C08J 2467/02* (2013.01); *C08L 2205/025* (2013.01); *C08L 2205/03* (2013.01); *C08L 2205/16* (2013.01); *C08L 2310/00* (2013.01)

(58) Field of Classification Search
CPC .............. C08L 23/12; C08L 2205/025; C08L 2205/03; C08L 2205/16; C08L 2310/00; C08L 2205/02; C08L 2207/02; C08L 23/26; C08J 3/226; C08J 5/042; C08J 5/043; C08J 2323/12; C08J 2423/30; C08J 2467/02; B29K 2023/12; B29K 2307/04; B29K 2309/08; C08K 7/02; C08K 7/06; C08K 7/14; C08F 2500/12
USPC ........................................................ 523/206
See application file for complete search history.

(56) References Cited

U.S. PATENT DOCUMENTS

| | | | |
|---|---|---|---|
| 5,234,879 | A | 8/1993 | Garoff et al. |
| 9,309,395 | B2 | 4/2016 | Hemmeter et al. |
| 9,382,410 | B2 | 7/2016 | Bernreitner et al. |
| 10,059,785 | B2 | 8/2018 | Kulshreshtha et al. |
| 10,174,189 | B2 | 1/2019 | Jerabek et al. |
| 10,392,498 | B2 | 8/2019 | Jerabek et al. |
| 10,450,452 | B2 | 10/2019 | Lummerstorfer et al. |
| 10,752,762 | B2 * | 8/2020 | Lummerstorfer ....... C08L 23/12 |
| 2004/0220325 | A1 | 11/2004 | Kitano et al. |
| 2006/0137799 | A1 * | 6/2006 | Haque ..................... B60R 13/08 156/182 |
| 2006/0264544 | A1 | 11/2006 | Lustiger et al. |
| 2011/0034634 | A1 | 2/2011 | Grein et al. |
| 2014/0170918 | A1 | 6/2014 | Angus, Jr. et al. |
| 2015/0291789 | A1 | 10/2015 | Hirata et al. |
| 2016/0053092 | A1 * | 2/2016 | Fujita ....................... C08K 7/14 524/494 |
| 2017/0166711 | A1 * | 6/2017 | Boragno .................. C08J 3/203 |
| 2018/0371210 | A1 | 12/2018 | Dix et al. |
| 2019/0136024 | A1 | 5/2019 | Boragno |
| 2019/0177520 | A1 | 6/2019 | Aarnio-Winterhof et al. |
| 2019/0284381 | A1 | 9/2019 | Grestenberger et al. |
| 2020/0017671 | A1 * | 1/2020 | Lummerstorfer ....... C08L 33/24 |

FOREIGN PATENT DOCUMENTS

| | | |
|---|---|---|
| CA | 3032481 A1 | 4/2018 |
| CN | 101583662 A | 11/2009 |
| CN | 104870531 A | 8/2015 |
| EA | 201990842 A1 | 9/2019 |
| EP | 0491566 B1 | 9/1992 |
| EP | 0887379 | 12/1998 |
| EP | 2610271 A1 | 7/2013 |
| EP | 2610272 A1 | 7/2013 |
| EP | 2610273 A1 | 7/2013 |
| EP | 2754691 A1 | 7/2014 |

(Continued)

OTHER PUBLICATIONS

Japanese Opposition filed Jun. 28, 2020.
Chemical Encyclopedia, Moscow publisher, "Bolshaya Rossiyskaya Encyclopedia", 1992, vol. 3, p. 618.
Office action for Eurasian Patent Application No. 201990841/28, dated Feb. 25, 2020.

(Continued)

*Primary Examiner* — Hannah J Pak
(74) *Attorney, Agent, or Firm* — Tarolli, Sundheim, Covell & Tummino LLP

(57) ABSTRACT

The present invention relates to a new composite comprising glass or carbon fibers and polymer-based fibers as well as to a process for the preparation of the composite and molded articles made from said composite.

11 Claims, No Drawings

(56) References Cited

FOREIGN PATENT DOCUMENTS

| | | |
|---|---|---|
| JP | 4-202545 A | 7/1992 |
| JP | 7-314443 A | 12/1995 |
| JP | 11-255987 A | 9/1999 |
| JP | 2005-206639 A | 8/2005 |
| JP | 2005290021 A | 10/2005 |
| JP | 2006-124454 A | 5/2006 |
| JP | 2009-013331 A | 1/2009 |
| JP | 2009149823 A | 7/2009 |
| JP | 2010-121108 A | 6/2010 |
| JP | 2011-106665 A | 6/2011 |
| JP | 2012-006252 A | 1/2012 |
| JP | 2012-167250 A | 9/2012 |
| JP | 2012167250 A | 9/2012 |
| JP | 2013-1723 A | 1/2013 |
| JP | 2013-014687 A | 1/2013 |
| JP | 2013001723 A | 1/2013 |
| JP | 2014-118525 A | 6/2014 |
| JP | 2015052102 A | 3/2015 |
| JP | 2016-132759 A | 7/2016 |
| JP | 2016132759 A | 7/2016 |
| WO | 87/07620 A1 | 12/1987 |
| WO | 92/12182 | 7/1992 |
| WO | 92/19653 A1 | 11/1992 |
| WO | 92/19658 A1 | 11/1992 |
| WO | 99/24479 A1 | 10/1994 |
| WO | 99/24478 A1 | 5/1999 |
| WO | 99/33843 A1 | 7/1999 |
| WO | 00/68315 | 11/2000 |
| WO | 2004/000899 | 12/2003 |
| WO | 2004/111095 A1 | 12/2004 |
| WO | 2006/006807 A1 | 1/2006 |
| WO | 2012/007430 A1 | 1/2012 |
| WO | 2014/003017 A1 | 1/2014 |
| WO | 2014033017 A1 | 3/2014 |
| WO | 2014/098103 A1 | 6/2014 |
| WO | WO 2016/101139 * 6/2016 | ............. C08L 23/14 |
| WO | 2017/073482 A1 | 5/2017 |
| WO | 2017/073483 A1 | 5/2017 |

OTHER PUBLICATIONS

Prime Polymer, May 15, 2019. https://web.archive.org/web/20160919091217/http://www.primepolymer.co.jp/technology/material/pp/06.html.

Thermal Property (4) Softening Point / Melting Point, 2016, latest posting on Oct. 7. https://web.archive.org/web/20161007140356/http://www.kaienken.jp/db/chap1.html.

Trivia of Plastics, 2016, latest posting on Oct. 2. https://web.archive.org/web/20161002064017/https://www.maolan.co.jp/information/plastic.

Office action for Japanese Patent Application No. 2019-515323, dated Aug. 20, 2019.

Canadian Office action for Patent Application No. 3,037,113, dated Apr. 25, 2019.

Kakugo et al., "13C NMR Determination of Monomer Sequence Distribution in Ethylene-Propylene Copolymers Prepared with d-TiC13—A1 (C2H5)2C1" Macromolecules 1982, 15, pp. 1150-1152.

Zweifel, et al., "Plastics Additives Handbook", 6th Edition, Department of Materials, institute of Polymers, 2008.

Singh et al., "Triad sequence determination of ethylene-propylene copolymers—application of quantitative 13C NMR", Polymer Testing 28 (2009) pp. 475-479.

Zweifel, et al., "Plastics Additives Handbook", 5th Edition, Department of Materials, Institute of Polymers, 2001.

Wang et al., "Structural Analysis of Ethylene/Propylene Copolymers Synthesized with a Constrained Geometry Catalyst", Macromolecules 2000, 33, pp. 1157-1162.

H.N.Cheng, "13C NMR Analysis of Ethylene-Propylene Rubbers", Macromolecules 1984, 17, 1950-1955.

Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, pp. 1128-1134.

Resconi, et al., "Selectivity in Propene Polymerization with Metallocene Catalysts", Chem. Rev. 2000, pp. 1253-1345.

Zhou, et al., "A new decoupling method for accurate quantification of polyethylene copolymer composition and triad sequence distribution with 13C NMR", Journal of Magnetic Resonance 187, (2007), pp. 225-233.

Prime Polymer Co. Ltd., "Product Data Sheet Prime Polypro (Injection: Homopolymer, Random Copolymer)" 2 pages submitted, Information from Homepage of Prime Polymer Co., Ltd., http://www.primepolymer.co.jp/product/pp/pdf/primepp-hr201907.pdf; Publication in 2019.

Applicant: Borealis AG; "Fiber Reinforced Polypropylene Composite"; Chinese Patent Application No. 201780059842.6; Chinese Office Action; dated Mar. 19, 2021; 36 pgs.

* cited by examiner

FIBER REINFORCED POLYPROPYLENE COMPOSITE

The present invention relates to a new composite comprising glass or carbon fibers and polymer-based fibers as well as to a process for the preparation of the composite and molded articles made from said composite.

Reinforced composites are well known and quite often applied in the automobile industry. One particular example of reinforced polypropylenes are glass fiber reinforced polypropylenes or carbon fiber reinforced polypropylenes. Such materials enable a tailoring of the properties of the composition by selecting the type of polypropylene, the amount of glass or carbon fiber and sometimes by selecting the type of coupling agent used. Accordingly, nowadays fiber reinforced polypropylene is a well-established material for applications requiring high stiffness. However, one drawback of the commercially available fiber reinforced materials is their moderate to poor impact strength and mainly brittle failure mechanism. The traditional route to improve impact strength of fiber reinforced composites is the addition of substantial amounts of elastomers but stiffness and strength are deteriorated at the same time.

Thus, there is still a need in the art for composites being lightweight, easy to process and having a favourable mechanical property profile, preferably improved impact strength, especially compared to composites comprising glass fibers or carbon fibers as reinforcing fiber material only.

The finding of the present invention is to provide a composite comprising 25 to 92.5 wt.-%, based on the total weight of the composite, of a polypropylene base material having a melt flow rate MFR$_2$ (230° C., 2.16 kg) measured according to ISO 1133 in the range of from 3.0 to 140.0 g/10 min, wherein the polypropylene base material is i) a heterophasic propylene copolymer (HECO) comprising a (semicrystalline) polypropylene (PP) as a matrix in which an elastomeric propylene copolymer (EC) is dispersed; or ii) a propylene homopolymer (hPP); and 5 to 50 wt.-%, based on the total weight of the composite, of a glass fiber (GF) or carbon fiber (CF); and 2.5 to 25 wt.-%, based on the total weight of the composite, of a polymer-based fiber (PF).

Accordingly, the present invention is especially directed to a composite comprising a) 25 to 92.5 wt.-%, based on the total weight of the composite, of a polypropylene base material having a melt flow rate MFR$_2$ (230° C., 2.16 kg) measured according to ISO 1133 in the range of from 3.0 to 140.0 g/10 min, wherein the polypropylene base material is
  i) a heterophasic propylene copolymer (HECO) comprising a (semicrystalline) polypropylene (PP) as a matrix in which an elastomeric propylene copolymer (EC) is dispersed; or
  ii) a propylene homopolymer (hPP); and
b) 5 to 50 wt.-%, based on the total weight of the composite, of a glass fiber (GF) or carbon fiber (CF); and
c) 2.5 to 25 wt.-%, based on the total weight of the composite, of a polymer-based fiber (PF) having a melting temperature of ≥210° C.,
wherein the weight ratio of the glass fiber (GF) or carbon fiber (CF) to the polymer-based fiber (PF) [(GF) or (CF)/(PF)] is at least 2:1.

In one embodiment the heterophasic propylene copolymer (HECO) has a) a melt flow rate MFR$_2$ (230° C., 2.16 kg) in the range of from 5.0 to 120.0 g/10 min, and/or b) a xylene cold soluble (XCS) fraction (25° C.) of from 15.0 to 50.0 wt.-%, based on the total weight of the heterophasic propylene copolymer (HECO), and/or c) a comonomer content of ≤30.0 mol.-%, based on the heterophasic propylene copolymer (HECO).

In another embodiment the amorphous fraction (AM) of the heterophasic propylene copolymer (HECO) has a) a comonomer content in the range of 30.0 to 60.0 mol.-%, based on the amorphous fraction (AM) of the heterophasic propylene copolymer (HECO), and/or b) an intrinsic viscosity (IV) in the range of 1.8 to 4.0 dl/g.

In yet another embodiment the propylene homopolymer (hPP) has a) a melt flow rate MFR$_2$ (230° C., 2.16 kg) in the range of from 5.0 to 120.0 g/10 min, and/or b) a melting temperature measured according to ISO 11357-3 of at least 150° C., and/or c) a xylene cold soluble (XCS) content, i.e. below 4.5 wt.-%, based on the total weight of the propylene homopolymer (hPP).

In one embodiment the glass fiber (GF) or carbon fiber (CF) has a fiber average diameter in the range of 5 to 30 μm and/or an average fiber length from 0.1 to 20 mm.

In another embodiment the glass fiber (GF) or carbon fiber (CF) comprises a sizing agent.

In yet another embodiment the polymer-based fiber (PF) is selected from a poly vinyl alcohol (PVA) fiber, a polyethylene terephthalate (PET) fiber, a polyamide (PA) fiber and mixtures thereof, preferably a polyethylene terephthalate (PET) fiber.

In one embodiment the polymer-based fiber (PF) has an average fiber length of 0.1 to 20 mm, and/or a fiber average diameter in the range of 5 to 30 μm, and/or a tenacity of from 3.0 cN/dtex to 17 cN/dtex.

In another embodiment the melting temperature Tm according to ISO 11357-3 of the polymer-based fiber (PF) is ≥40° C., preferably from 40 to 200° C., above the melting temperature Tm according to ISO 11357-3 of the polypropylene base material.

In yet another embodiment the composite comprises an adhesion promoter (AP), preferably in an amount from 0.1 to 7.0 wt.-%, based on the total weight of the composite. In one embodiment the adhesion promoter (AP) is selected from the group consisting of an acid modified polyolefin, an anhydride modified polyolefin and a modified styrene block copolymer, preferably a maleic anhydride functionalized polypropylene.

In another embodiment the composite is obtainable by a process as defined herein.

The present invention is further directed to a process for the preparation of a composite as defined herein, comprising the steps of:
 a) providing a polypropylene base material as defined herein,
 b) providing a glass fiber (GF) or carbon fiber (CF) as defined herein in form of a continuous fiber,
 c) providing a polymer-based fiber (PF) as defined herein in form of a continuous fiber,
 d) impregnating and coating the fiber of step b) with the polypropylene base material of step a) such as to obtain a fiber reinforced polypropylene base material,
 e) impregnating and coating the polymer-based fiber (PF) of step c) with the polypropylene base material of step a) such as to obtain a polymer-based fiber reinforced polypropylene base material, and
 f) optionally injection molding the composition obtained by blending the fiber reinforced polypropylene base material of step d) and the polymer-based fiber reinforced polypropylene base material obtained of step e), wherein process steps d) and e) are carried out simultaneously or separately in any order.

According to one embodiment of the present process, process steps d) and e) are carried out by pultrusion.

According to another embodiment of the present process, process steps d) and e) are carried out separately and the blending of the fiber reinforced polypropylene base material of step d) and the polymer-based fiber reinforced polypropylene base material of step e) is carried out by dry-blending before step f), if present.

The present invention is also directed to a molded article comprising a composite as defined in the present invention. The molded article is preferably an automotive article.

The invention is now defined in more detail.

The Composite

As mentioned above the composite must comprise a polypropylene base material (PBM), glass fiber (GF) or carbon fiber (CF), and a polymer-based fiber (PF).

In addition, the composite may comprise an adhesion promoter (AP), alpha nucleating agents (NU) and/or additives (A). In one embodiment, the composite comprises an adhesion promoter (AP). In this embodiment, it is preferred that the polypropylene base material, the glass fiber (GF) or carbon fiber (CF), the polymer-based fiber (PF) and the adhesion promoter (AP) make up together at least 80 wt.-%, more preferably at least 85 wt.-%, yet more preferably at least 90 wt.-%, like at least 95 wt.-%, based on the total weight of the composite, of the composite.

Accordingly, in one specific embodiment the composite consists of the polypropylene base material (PBM), the glass fiber (GF) or carbon fiber (CF), and the polymer-based fiber (PF), the adhesion promoter (AP) and the optional alpha nucleating agents (NU) and/or additives (A).

It is appreciated that the composite comprises the polymer-based fiber (PF) in amounts being below the amount of the glass fiber (GF) or carbon fiber (CF). It is thus specifically required that the weight ratio of the glass fiber (GF) or carbon fiber (CF) to the polymer-based fiber (PF) [(GF) or (CF)/(PF)] is at least 2:1. In one preferred embodiment the weight ratio of the glass fiber (GF) or carbon fiber (CF) and the polymer-based fiber (PF) [(GF) or (CF)/(PF)] is in the range of 2.0 to 30.0, more preferably in the range of 2.0 to 20.0, and most preferably in the range of 2.0 to 10.0.

Alternatively or additionally to the previous paragraph it is preferred that the weight ratio of the polypropylene base material (PBM) to the glass fiber (GF) or carbon fiber (CF) [(PBM)/(GF) or (CF)] is in the range of 0.25 to 30.0, more preferably in the range of 0.5 to 20.0, yet more preferably in the range of 1.25 to 10.0, like in the range of 2.0 to 6.0.

Alternatively or additionally to the previous paragraphs it is preferred that the weight ratio of the polypropylene base material (PBM) to the polymer-based fiber (PF) [(PBM)/(PF)] is in the range of 1.0 to 75.0, more preferably in the range of 2.0 to 50.0, yet more preferably in the range of 3.0 to 30.0, like in the range of 4.0 to 25.0.

In one preferred embodiment, the total weight of the glass fiber (GF) or carbon fiber (CF) and the polymer-based fiber (PF) is in the range of 6.0 to 50.0 wt.-%, based on the total weight of the composite, preferably in the range of 8.0 to 49.0 wt.-%, more preferable in the range of 12.0 to 47.0 wt.-% and most preferably in the range of 15.0 to 45.0 wt.-%

Thus, the weight ratio of the polypropylene base material (PBM) to the sum of the glass fiber (GF) or carbon fiber (CF) and the polymer-based fiber (PF) [(PBM)/((GF or CF)+PF)] is preferably in the range of 1.0 to 15.7, more preferably in the range of 1.0 to 11.5, yet more preferably in the range of 1.1 to 7.0.

If present, the weight ratio of the glass fiber (GF) or carbon fiber (CF) to the adhesion promoter (AP) [(GF) or (CF)/(AP)] is in the range of 0.8 to 300.0, more preferably in the range 4.0 to 50.0, yet more preferably in the range of 4.0 to 20.0.

Alternatively or additionally to the previous paragraph it is preferred that the weight ratio of the polymer-based fiber (PF) and the adhesion promoter (AP) [(PF)/(AP)] is in the range of 0.1 to 250.0, more preferably in the range 0.8 to 20.0, yet more preferably in the range of 1.0 to 12.0.

It is especially preferred that the composite comprises
a) 25.0 to 92.5 wt.-%, more preferably 50.0 to 91.0 wt.-%, still more preferably 55.0 to 90.0 wt.-%, yet more preferably 58.0 to 89.0 wt.-% and most preferably 60.0 to 88.0 wt.-%, based on the total weight of the composite, of a polypropylene base material (PBM) having a melt flow rate $MFR_2$ (230° C., 2.16 kg) measured according to ISO 1133 in the range of from 3.0 to 140.0 g/10 min, wherein the polypropylene base material (PBM) is
 i) a heterophasic propylene copolymer (HECO) comprising a (semicrystalline) polypropylene (PP) as a matrix in which an elastomeric propylene copolymer (EC) is dispersed; or
 ii) a propylene homopolymer (hPP); and
b) 5.0 to 50.0 wt.-%, more preferably 8.6 to 45.0 wt.-%, still more preferably 10.0 to 40.0 wt.-%, yet more preferably 12.5 to 35.0 wt.-% and most preferably 15.0 to 30.0 wt.-%, based on the total weight of the composite, of a glass fiber (GF) or carbon fiber (CF); and
c) 2.5 to 25.0 wt.-%, more preferably 1.4 to 22.0 wt.-%, still more preferably 2.0 to 19.0 wt.-%, yet more preferably 2.5 to 18.0 wt.-% and most preferably 3.0 to 15.0 wt.-%, based on the total weight of the composite, of a polymer-based fiber (PF) having a melting temperature of ≥210° C.,
wherein the weight ratio of the glass fiber (GF) or carbon fiber (CF) to the polymer-based fiber (PF) [(GF) or (CF)/(PF)] is at least 2:1.

In one embodiment, the composite comprises an adhesion promoter (AP).

Therefore, it is especially preferred that the composite comprises, preferably consists of,
a) 25.0 to 92.5 wt.-%, more preferably 50.0 to 91.0 wt.-%, still more preferably 55.0 to 90.0 wt.-%, yet more preferably 58.0 to 89.0 wt.-% and most preferably 60.0 to 88.0. wt.-%, based on the total weight of the composite, of a polypropylene base material (PBM) having a melt flow rate $MFR_2$ (230° C., 2.16 kg) measured according to ISO 1133 in the range of from 3.0 to 140.0 g/10 min, wherein the polypropylene base (PBM) material is
 i) a heterophasic propylene copolymer (HECO) comprising a (semicrystalline) polypropylene (PP) as a matrix in which an elastomeric propylene copolymer (EC) is dispersed; or
 ii) a propylene homopolymer (hPP); and
b) 5.0 to 50.0 wt.-%, more preferably 8.6 to 45.0 wt.-%, still more preferably 10.0 to 40.0 wt.-%, yet more preferably 12.5 to 35.0 wt.-% and most preferably 15.0 to 30.0 wt.-%, based on the total weight of the composite, of a glass fiber (GF) or carbon fiber (CF); and
c) 2.5 to 25.0 wt.-%, more preferably 1.4 to 20.0 wt.-%, still more preferably 2.0 to 16.0 wt.-%, yet more preferably 2.5 to 16.0 wt.-% and most preferably 3.0 to 15.0 wt.-%, based on the total weight of the composite, of a polymer-based fiber (PF) having a melting temperature of ≥210° C., and d) optionally up to 7.0 wt.-%, more preferably 0.1 to 7.0 wt.-%, still more preferably 0.1 to 6.5 wt.-%, yet more preferably 0.2 to 6.5 wt.-% and most preferably 0.2 to 6.0 wt.-%, based on the total weight of the composite, of an adhesion promoter (AP), wherein the weight ratio of the glass fiber (GF) or carbon fiber (CF) to the polymer-based fiber (PF) [(GF) or (CF)/(PF)] is at least 2:1.

The composite may comprise in addition alpha-nucleating agents (NU) and/or additives (A). According to this invention the alpha nucleating agent (NU) is not an additive (A). Accordingly, it is preferred that the composite contains up to 5.0 wt.-%, preferably $1.0 \times 10^{-5}$ to 4.0 wt.-%, more preferably $2.0 \times 10^{-5}$ to 2.0 wt.-%, based on the total weight of the composite, of alpha nucleating agents (NU) and/or up to 8.0 wt.-%, preferably 0.1 to 6.0 wt.-%, more preferably 0.5 to 4.0 wt.-%, based on the total weight of the composite, of additives (A).

It is appreciated that the sum of the polypropylene base material (PBM), the glass fiber (GF) or carbon fiber (CF), polymer-based fiber (PF) and the optional adhesion promoter (AP), alpha-nucleating agents (NU) and additives (A) is 100.0 wt.-%, based on the total weight of the composite.

In one embodiment, the composite is free of a polyethylene (PE). Particularly, it is preferred that the composite is free of a polyethylene (PE) having a density in the range of 935 to 970 kg/m$^3$. Accordingly, it is preferred that the composite is free of a high density polyethylene (HDPE).

Preferably the composite has a density in the range of 900 to 1 300 kg/cm$^3$, more preferably in the range of 925 to 1 200 kg/m$^3$, yet more preferably in the range of 930 to 1 100 kg/cm$^3$.

It is especially preferred that the composite has a melt flow rate MFR$_2$ (190° C., 5 kg) in the range of 0.5 to 45.0 g/10 min, more preferably in the range of 0.8 to 42.0 g/10 min, still more preferably in the range of 1.0 to 41.0 g/10 min, like in the range of 1.2 to 40.0 g/10 min.

It is appreciated that the composite has an elongation at break measured according to ISO 527-4 in the range from 0.5 to 6%, preferably in the range from 0.8 to 6%.

The present composite has specifically high toughness. The composite preferably has a tensile modulus of at least 2 000 MPa, preferably in the range of 2 000 to 30 000 MPa, more preferably in the range of 2 500 to 28 000 MPa, yet more preferably in the range of 3 000 to 25 000 MPa, e.g. from 4 000 to 22 000 MPa.

The finding of the present invention is that the composite has specifically high impact strength. Preferably, the composite has a Charpy notched impact strength (23° C.) of at least 5 kJ/m$^2$, more preferably in the range of 5 to 160.0 kJ/m$^2$, even more preferably in the range of 10 to 120.0 kJ/m$^2$ and most preferably in the range of 15 to 100.0 kJ/m$^2$. It is preferred that the Charpy notched impact strength (23° C.) of the composite of the present invention is higher compared to the same composite comprising glass fiber (GF) or carbon fiber (CF) as reinforcing fiber material only, i.e. being free of the polymer-based fiber (PF), e.g. by at least 20% higher, preferably in the range of 20 to 10 000% higher, more preferably in the range of 25 to 5 000% higher, like in the range of 25 to 1 000% higher.

For example, if the polypropylene base material of the composite is a propylene homopolymer (hPP), the composite preferably has a Charpy notched impact strength (23° C.) of at least 5 kJ/m$^2$, more preferably in the range of 5 to 160.0 kJ/m$^2$, even more preferably in the range of 10 to 120.0 kJ/m$^2$ and most preferably in the range of 15 to 100.0 kJ/m$^2$. In this embodiment, the Charpy notched impact strength (23° C.) of the composite of the present invention is higher compared to the same composite comprising glass fiber (GF) or carbon fiber (CF) as reinforcing fiber material only, i.e. being free of the polymer-based fiber (PF), e.g. by at least 50% higher, preferably in the range of 50 to 10 000% higher, more preferably in the range of 50 to 5 000% higher, like in the range of 50 to 1 000% higher.

If the polypropylene base material of the composite is a heterophasic propylene copolymer (HECO), the composite preferably has a Charpy notched impact strength (23° C.) of at least 5 kJ/m$^2$, more preferably in the range of 5 to 160.0 kJ/m$^2$, even more preferably in the range of 10 to 120.0 kJ/m$^2$ and most preferably in the range of 15 to 100.0 kJ/m$^2$. In this embodiment, the Charpy notched impact strength (23° C.) of the composite of the present invention is higher compared to the same composite comprising glass fiber (GF) or carbon fiber (CF) as reinforcing fiber material only, i.e. being free of the polymer-based fiber (PF), e.g. by at least 20% higher, preferably in the range of 20 to 5 000% higher, more preferably in the range of 25 to 1 000% higher, like in the range of 25 to 400% higher.

Preferably, the composite has a correlation of tensile modulus to Charpy notched impact strength (23° C.) [TM/NIS] of below 3 000, more preferably in the range of 50 to 3 000, even more preferably in the range of 80 to 2 500 and most preferably in the range of 90 to 700. For example, the composite has a correlation of tensile modulus to Charpy notched impact strength (23° C.) [TM/NIS] in the range of 100 to 800.

For example, if the polypropylene base material of the composite is a propylene homopolymer (hPP), the composite preferably has a correlation of tensile modulus to Charpy notched impact strength (23° C.) [TM/NIS] of below 1 000, more preferably in the range of 50 to 1 000, even more preferably in the range of 100 to 900 and most preferably in the range of 150 to 850, such as in the range of 200 to 800.

If the polypropylene base material of the composite is a heterophasic propylene copolymer (HECO), the composite preferably has a correlation of tensile modulus to Charpy notched impact strength (23° C.) [TM/NIS] of below 1 000, more preferably in the range of 50 to 1 000, even more preferably in the range of 80 to 800 and most preferably in the range of 90 to 700, such as in the range of 100 to 600.

For example, if the composite comprises glass fibers (GF), the composite preferably has a correlation of tensile modulus to Charpy notched impact strength (23° C.) [TM/NIS] of below 2 000, more preferably in the range of 50 to 2 000, even more preferably in the range of 80 to 1 000 and most preferably in the range of 90 to 500, such as in the range of 100 to 400.

Alternatively, if the composite comprises carbon fibers (CF), the composite preferably has a correlation of tensile modulus to Charpy notched impact strength (23° C.) [TM/NIS] of below 3 000, more preferably in the range of 50 to 2 000, even more preferably in the range of 80 to 1 500 and most preferably in the range of 100 to 1 000, such as in the range of 150 to 800.

In the following the individual components of the composite are defined in more detail.

The Polypropylene Base Material

The composite according to this invention must contain a polypropylene base material (PBM) having a melt flow rate MFR$_2$ (230° C., 2.16 kg) measured according to ISO 1133 in the range of from 3.0 to 140.0 g/10 min. Preferably, the polypropylene base material (PBM) has a melt flow rate MFR$_2$ (230° C., 2.16 kg) in the range of 5.0 to 120.0 g/10 min, more preferably in the range of 5.5 to 100.0 g/10 min, still more preferably in the range of 6.0 to 80.0 g/10 min, like in the range of 7.0 to 78.0 g/10 min.

It is appreciated that the polypropylene base material (PBM) is either a heterophasic propylene copolymer (HECO) comprising a (semicrystalline) polypropylene (PP) as a matrix in which an elastomeric propylene copolymer (EC) is dispersed; or a propylene homopolymer (hPP).

If the polypropylene base material (PBM) is either a heterophasic propylene copolymer (HECO), the heterophasic propylene copolymer (HECO) comprises a polypropylene (PP) as a matrix in which an elastomeric propylene copolymer (EC) is dispersed. The expression "heterophasic propylene copolymer" or "heterophasic" as used in the instant invention indicates that the elastomeric propylene copolymer (EC) is (finely) dispersed in the (semicrystalline) polypropylene (PP). In other words, the (semicrystalline) polypropylene (PP) constitutes a matrix in which the elastomeric propylene copolymer (EC) forms inclusions in the matrix, i.e. in the (semicrystalline) polypropylene (PP). Thus the matrix contains (finely) dispersed inclusions being not part of the matrix and said inclusions contain the elastomeric propylene copolymer (EC). The term "inclusion" according to this invention shall preferably indicate that the matrix and the inclusion form different phases within the heterophasic propylene copolymer (HECO), said inclusions are for instance visible by high resolution microscopy, like electron microscopy or atomic force microscopy, or by dynamic mechanical thermal analysis (DMTA). Specifically, in DMTA the presence of a multiphase structure can be identified by the presence of at least two distinct glass transition temperatures.

Preferably, the heterophasic propylene copolymer (HECO) has a melt flow rate MFR$_2$ (230° C., 2.16 kg) in the range of 3.0 to 140.0 g/10 min, more preferably in the range of 5.0 to 120.0 g/10 min, more preferably in the range of 5.5 to 100.0 g/10 min, still more preferably in the range of 6.0 to 80.0 g/10 min, like in the range of 7.0 to 78.0 g/10 min. In one embodiment, the heterophasic propylene copolymer (HECO) has a melt flow rate MFR$_2$ (230° C., 2.16 kg) in the range of 5.0 to 75.0 g/10 min, even more preferably in the range of 5.0 to 50.0 g/10 min, still more preferably in the range of 5.0 to 30.0 g/10 min, and most preferably in the range of 6.0 to 25.0 g/10 min, like in the range of 7.0 to 20.0 g/10 min.

As mentioned above, the heterophasic propylene copolymer (HECO) according to this invention preferably comprises (a) a (semicrystalline) polypropylene (PP) as the matrix (M) and (b) an elastomeric propylene copolymer (EC).

Preferably the heterophasic propylene copolymer (HECO) has a comonomer content, preferably a content of ethylene and/or C$_4$ to C$_{12}$ α-olefin, more preferably an ethylene content, of equal or below 30.0 mol.-%, more preferably in the range of 10.0 to 30.0 mol.-%, still more preferably in the range of 12.0 to 25.0 mol.-%, yet more preferably in the range of 14.0 to 22.0 mol.-%, based on the heterophasic propylene copolymer (HECO).

Preferably the heterophasic propylene copolymer (HECO) has a xylene cold soluble (XCS) fraction (25° C.) in the range of 15.0 to 50.0 wt.-%, more preferably in the range of 22.0 to 50.0 wt.-%, still more preferably in the range of 25.0 to 45.0 wt.-% and most preferably in the range of 26.0 to 38.0 wt. %.

Preferably the comonomer content, preferably the content of ethylene and/or C$_4$ to C$_{12}$ α-olefin, more preferably the content of ethylene, of the amorphous fraction (AM) of the heterophasic propylene copolymer (HECO) is in the range of 30.0 to 60 mol.-%, more preferably in the range of 35.0 to 55.0 mol.-%, still more preferably in the range of 38.0 to 54.0 mol.-%, yet more preferably in the range of 40.0 to 52.0 mol.-%, based on the amorphous fraction (AM) of the heterophasic propylene copolymer (HECO).

In a preferred embodiment the intrinsic viscosity (IV) of the amorphous fraction (AM) of the heterophasic propylene copolymer (HECO) is rather high. Rather high values of intrinsic viscosity (IV) improve the impact strength. Accordingly, it is especially preferred that the intrinsic viscosity of the amorphous fraction (AM) of the heterophasic propylene copolymer (HECO) is above 1.8 dl/g, more preferably at least 2.0 dl/g. On the other hand, the intrinsic viscosity (IV) should be not too high otherwise the flowability is decreased. Thus the intrinsic viscosity of the amorphous fraction (AM) of the heterophasic propylene copolymer (HECO) is preferably in the range of 1.8 to 4.0 dl/g, more preferably in the range 2.0 to 3.6 dl/g and even more preferably in the range of 2.0 to 3.2 dl/g.

The (semicrystalline) polypropylene (PP) is preferably a (semicrystalline) random propylene copolymer (R-PP) or a (semicrystalline) propylene homopolymer (H-PP), the latter especially preferred.

The expression "propylene homopolymer" used in the instant invention relates to a polypropylene that consists substantially, i.e. of more than 99.55 mol-%, still more preferably of at least 99.70 mol-%, of propylene units. In a preferred embodiment only propylene units in the propylene homopolymer are detectable.

In case the (semicrystalline) polypropylene (PP) is a (semicrystalline) random propylene copolymer (R-PP) it is appreciated that the (semicrystalline) random propylene copolymer (R-PP) comprises monomers co-polymerizable with propylene, for example co-monomers such as ethylene and/or C$_4$ to C$_{12}$ α-olefins, in particular ethylene and/or C$_4$ to C$_8$ α-olefins, e.g. 1-butene and/or 1-hexene. Preferably the (semicrystalline) random propylene copolymer (R-PP) according to this invention comprises, especially consists of, monomers co-polymerizable with propylene from the group consisting of ethylene, 1-butene and 1-hexene. More specifically the (semicrystalline) random propylene copolymer (R-PP) of this invention comprises—apart from propylene—units derivable from ethylene and/or 1-butene. In a preferred embodiment the (semicrystalline) random propylene copolymer (R-PP) comprises units derivable from ethylene and propylene only.

Additionally, it is appreciated that the (semicrystalline) random propylene copolymer (R-PP) has preferably a co-monomer content in the range of more than 0.4 to 1.5 mol-%, more preferably in the range of more than 0.3 to 1.2 mol-%, yet more preferably in the range of 0.4 to 1.0 mol-%.

The term "random" indicates that the co-monomers of the (semicrystalline) random propylene copolymers (R-PP) are randomly distributed within the propylene copolymer. The term random is understood according to IUPAC (Glossary of basic terms in polymer science; IUPAC recommendations 1996).

As will be explained below, the heterophasic propylene copolymer (HECO) can be produced by blending the (semicrystalline) polypropylene (PP) and the elastomeric propylene copolymer (EC). However, it is preferred that the heterophasic propylene copolymer (HECO) is produced in a sequential step process, using reactors in serial configuration and operating at different reaction conditions. Typically, the (semicrystalline) polypropylene (PP) is produced in at least one first reactor and subsequently the elastomeric propylene copolymer (EC) in at least one second reactor.

Further it is appreciated that the (semicrystalline) polypropylene (PP), like (semicrystalline) propylene homopolymer (H-PP), of the heterophasic propylene copolymer (HECO) has a moderate melt flow $MFR_2$ (230° C.). Thus it is preferred that the (semicrystalline) polypropylene (PP), like (semicrystalline) propylene homopolymer (H-PP), of the heterophasic propylene copolymer (HECO) has a melt flow rate $MFR_2$ (230° C.) measured according to ISO 1133 of 3.0 to 140.0 g/10 min, preferably in the range of 5.0 to 120.0 g/10 min, more preferably in the range of 5.5 to 100.0 g/10 min, still more preferably in the range of 6.0 to 80.0 g/10 min, like in the range of 7.0 to 78.0 g/10 min.

The term "semicrystalline" indicates that the polymer is not amorphous. Accordingly, it is preferred that the semicrystalline polypropylene (PP) according to this invention has a xylene soluble fraction (XCS) of not more than 10 wt.-%, in case of a (semicrystalline) propylene homopolymer (H-PP) the xylene soluble fraction (XCS) is even lower, i.e. not more than 6.0 wt.

Accordingly, it is preferred that the (semicrystalline) propylene homopolymer (H-PP) has a xylene soluble fraction (XCS) of below 5.0 wt.-%, more preferably in the range of 0.5 to 4.5, like in the range of 1.0 to 3.5 wt.-%.

Preferably the (semicrystalline) polypropylene (PP) according to this invention has a melting temperature Tm above 135° C., more preferably above 140° C. In case of the (semicrystalline) propylene homopolymer (H-PP) the melting temperature Tm is above 150° C., like at least 156° C. Upper ranges are not more than 168° C., like not more than 167° C.

The second component of the heterophasic propylene copolymer (HECO) is the elastomeric propylene copolymer (EC).

Preferably said elastomeric propylene copolymer (EC) comprises units derived from
  propylene and
  ethylene and/or $C_4$ to $C_{12}$ α-olefin.

The elastomeric propylene copolymer (EC) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and/or at least another α-olefin selected form the group consisting of 1-butene, 1-pentene, 1-hexene, 1-heptene and 1-octene. The elastomeric propylene copolymer (EC) may additionally contain units derived from a conjugated diene, like butadiene, or a non-conjugated diene, however it is preferred that the elastomeric propylene copolymer (EC) consists of units derivable from (i) propylene and (ii) ethylene and/or $C_4$ to $C_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane.

Accordingly, the elastomeric propylene copolymer (EC) comprises at least units derivable from propylene and ethylene and may comprise other units derivable from a further α-olefin as defined in the previous paragraph. However, it is in particular preferred that elastomeric propylene copolymer (EC) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM) and/or an ethylene propylene rubber (EPR) as elastomeric propylene copolymer (EC) is especially preferred, the latter most preferred.

In the present invention the content of units derivable from propylene in the elastomeric propylene copolymer (EP) equates largely with the content of propylene detectable in the xylene cold soluble (XCS) fraction. Accordingly, the comonomer content, like the ethylene content, of the elastomeric propylene copolymer (EC) is in the range of 30.0 to 60 mol.-%, more preferably in the range of 35.0 to 55.0 mol.-%, still more preferably in the range of 38.0 to 54.0 mol.-%, yet more preferably in the range of 40.0 to 52.0 mol.-%, based on the elastomeric propylene copolymer (EC).

As mentioned above the heterophasic propylene copolymer (HECO) can be produced by blending the (semicrystalline) polypropylene (PP) and the elastomeric propylene copolymer (EC). However, it is preferred that the heterophasic propylene copolymer (HECO) is produced in a sequential step process, using reactors in serial configuration and operating at different reaction conditions. As a consequence, each fraction prepared in a specific reactor may have its own molecular weight distribution and/or comonomer content distribution.

The heterophasic propylene copolymer (HECO) according to this invention is preferably produced in a sequential polymerization process, i.e. in a multistage process, known in the art, wherein the (semicrystalline) polypropylene (PP) is produced at least in one slurry reactor, preferably in a slurry reactor and optionally in a subsequent gas phase reactor, and subsequently the elastomeric propylene copolymer (EC) is produced at least in one, i.e. one or two, gas phase reactor(s).

Accordingly, it is preferred that the heterophasic propylene copolymer (HECO) is produced in a sequential polymerization process comprising the steps of
  (a) polymerizing propylene and optionally at least one ethylene and/or $C_4$ to $C_{12}$ α-olefin in a first reactor (R1) obtaining the first polypropylene fraction of the (semicrystalline) polypropylene (PP), preferably said first polypropylene fraction is a propylene homopolymer,
  (b) transferring the first polypropylene fraction into a second reactor (R2),
  (c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the (semicrystalline) polypropylene (PP), i.e. the matrix of the heterophasic propylene copolymer (HECO),
  (d) transferring the (semicrystalline) polypropylene (PP) of step (c) into a third reactor (R3),
  (e) polymerizing in the third reactor (R3) and in the presence of the (semicrystalline) polypropylene (PP) obtained in step (c) propylene and at least one ethylene and/or $C_4$ to $C_{12}$ α-olefin obtaining thereby a first elastomeric propylene copolymer fraction, the first elastomeric propylene copolymer fraction is dispersed in the (semicrystalline) polypropylene (PP), (f) transferring the (semicrystalline) polypropylene (PP) in which the first elastomeric propylene copolymer fraction is dispersed in a fourth reactor (R4), and (g) polymerizing in the fourth reactor (R4) and in the presence of the mixture obtained in step (e) propylene and at least one ethylene and/or $C_4$ to $C_{12}$ α-olefin obtaining thereby the second elastomeric propylene copolymer fraction, the first and the second elastomeric propylene copolymer fraction form together the elastomeric propylene copolymer (EC);

the (semicrystalline) polypropylene (PP) and the elastomeric propylene copolymer (EC) form the heterophasic propylene copolymer (HECO).

Of course, in the first reactor (R1) the second polypropylene fraction can be produced and in the second reactor (R2) the first polypropylene fraction can be obtained. The same holds true for the elastomeric propylene copolymer phase. Accordingly, in the third reactor (R3) the second elastomeric propylene copolymer fraction can be produced whereas in the fourth reactor (R4) the first elastomeric propylene copolymer fraction is made.

Preferably between the second reactor (R2) and the third reactor (R3) and optionally between the third reactor (R3) and fourth reactor (R4) the monomers are flashed out.

The term "sequential polymerization process" indicates that the heterophasic propylene copolymer (HECO) is produced in at least two, like three or four reactors connected in series. Accordingly, the present process comprises at least a first reactor (R1) and a second reactor (R2), more preferably a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) and the fourth reactor (R4) are preferably gas phase reactors (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly, for the instant process at least four, preferably four polymerization reactors, namely a slurry reactor (SR), like a loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) and the fourth reactor (R4) are gas phase reactors (GPR). Accordingly, for the instant process at least four, preferably four polymerization reactors, namely two slurry reactors (SR), like two loop reactors (LR), first gas phase reactor (GPR-1) and a second gas phase reactor (GPR-2) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3) and the fourth reactor (R4), preferably in the second gas phase reactor (GPR-2) and third gas phase reactor (GPR-3), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst may be a "non-phthalic" Ziegler-Natta procatalyst or a "phtalic" Ziegler-Natta procatalyst. First the "non-phthalic" Ziegler-Natta procatalyst is described, subsequently the phtalic" Ziegler-Natta procatalyst The "non-phthalic" Ziegler-Natta procatalyst comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the "non-phthalic" Ziegler-Natta procatalyst is fully free of undesired phthalic compounds. Further, the "non-phthalic" Ziegler-Natta procatalyst is free of any external support material, like silica or $MgCl_2$, but the catalyst is self-supported.

The "non-phthalic" Ziegler-Natta procatalyst can be further defined by the way as obtained. Accordingly, the "non-phthalic" Ziegler-Natta procatalyst is preferably obtained by a process comprising the steps of
a)
- $a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;
or
- $a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;
or
- $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the "non-phthalic" Ziegler-Natta procatalyst can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion—solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active "non-phthalic" Ziegler-Natta procatalyst composition. Solidification (step c) of the droplets is suitably carried out by heating the emulsion to a temperature of 70 to 150° C., preferably to 80 to 110° C.

The "non-phthalic" Ziegler-Natta procatalyst prepared by emulsion—solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition, a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt.-% solution in a solvent as indicated above. Typical commercially available Mg compound, especially dialkyl magnesium solutions are 20-40 wt.-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with a aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained "non-phthalic" Ziegler-Natta procatalyst is desirably in the form of particles having generally an average particle size range of 5 to 200 μm, preferably 10 to 100. Particles are compact with low porosity and have surface area below 20 g/m², more preferably below 10 g/m². Typically, the amount of Ti is 1 to 6 wt.-%, Mg 10 to 20 wt.-% and donor 10 to 40 wt.-% of the catalyst composition.

Detailed description of preparation of catalysts is disclosed in WO 2012/007430, EP2610271, EP 261027 and EP2610272 which are incorporated here by reference.

The "phthalic" Ziegler-Natta procatalyst is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

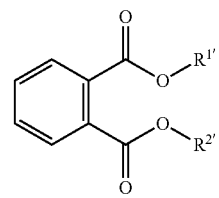

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The "phthalic" Ziegler-Natta procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanized carrier, followed by the steps of
adding to said titanised carrier
  (i) a dialkylphthalate of formula (I) with $R^{1'}$ and $R^{2'}$ being independently at least a $C_5$-alkyl, like at least a $C_8$-alkyl,
  or preferably
  (ii) a dialkylphthalate of formula (I) with $R^{1'}$ and $R^{2'}$ being the same and being at least a $C_5$-alkyl, like at least a $C_8$-alkyl, or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

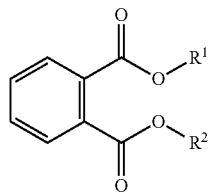

(II)

with $R^1$ and $R^2$ being methyl or ethyl, preferably ethyl, the dialkylphthalat of formula (II) being the internal donor and recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the "phthalic" Ziegler-Natta procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the "phthalic" Ziegler-Natta procatalyst used according to the invention has been produced by using ethanol as the alcohol and dioctylphthalate (DOP) as dialkylphthalate of formula (I), yielding diethyl phthalate (DEP) as the internal donor compound.

Still more preferably the "phthalic" Ziegler-Natta procatalyst used according to the invention is the catalyst as described in the example section; especially with the use of dioctylphthalate as dialkylphthalate of formula (I).

For the production of the heterophasic propylene copolymer (HECO) according to the invention the catalyst system used preferably comprises in addition to the special Ziegler-Natta procatalyst ("non-phthalic" or "phthalic") an organometallic cocatalyst as component (ii).

Accordingly, it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \qquad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \qquad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor is of formula (IIIa), like dicyclopentyl dimethoxy silane [$Si(OCH_3)_2(cyclo-pentyl)_2$], diisopropyl dimethoxy silane [$Si(OCH_3)_2(CH(CH_3)_2)_2$].

Most preferably the external donor is dicyclopentyl dimethoxy silane [$Si(OCH_3)_2(cyclo-pentyl)_2$].

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer [HECO] according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

Alternatively, the polypropylene base material (PBM) is a propylene homopolymer (hPP).

If the polypropylene base material (PBM) is a propylene homopolymer (hPP), the propylene homopolymer (hPP) is broadly understood and thus covers also embodiments in which different homopolymers are mixed. More precisely the term "propylene homopolymer (hPP)" may also cover embodiments in which two or more, like three, propylene homopolymers are mixed which differ in their melt flow rate. Accordingly, in one embodiment the term "propylene homopolymer (hPP)" covers just one propylene homopolymer with one specific melt flow rate, preferably in the range as defined below. In another embodiment the term "propylene homopolymer (hPP)" stands for a mixture of two or three, preferably two, propylene homopolymers, which differ in their melt flow rate. Preferably the two or three propylene homopolymers have a melt flow rate as in the range as defined below. According to this invention the melt flow differs from each other if the difference between the melt flow rates MFR$_2$ (230° C.) of two propylene homopolymers is at least 5 g/10 min, preferably at least 10 g/10 min, like at least 15 g/10 min.

The expression "propylene homopolymer (hPP)" as used herein relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable.

The propylene homopolymer (hPP) according to this invention must have a melt flow rate MFR$_2$ (230° C.) in the range of 3.0 to 140.0 g/10 min. Preferably, the propylene homopolymer (hPP) has a melt flow rate MFR$_2$ (230° C., 2.16 kg) in the range of 5.0 to 120.0 g/10 min, more preferably in the range of 5.5 to 100.0 g/10 min, still more preferably in the range of 6.0 to 80.0 g/10 min, like in the range of 7.0 to 78.0 g/10 min.

The propylene homopolymer (hPP) is preferably an isotactic propylene homopolymer. Accordingly, it is appreciated that the propylene homopolymer (hPP) has a rather high pentad concentration, i.e. higher than 90 mol-%, more preferably higher than 92 mol-%, still more preferably higher than 93 mol-% and yet more preferably higher than 95 mol-%, like higher than 99 mol-%.

Preferably the propylene homopolymer (hPP) has a melting temperature Tm measured according to ISO 11357-3 of at least 150° C., more preferably of at least 155° C., more preferably in the range of 150 to 168° C., still more preferably in the range of 155 to 167° C. and most preferably in the range of 160 to 167° C.

Further the propylene homopolymer (hPP) has a rather low xylene cold soluble (XCS) content, i.e. below 4.5 wt.-%, more preferably below 4.0 wt.-%, yet more preferably below 3.7 wt.-%. Thus it is appreciated that the xylene cold soluble (XCS) content is in the range of 0.5 to 4.5 wt.-%, more preferably in the range of 1.0 to 4.0 wt.-%, yet more preferably in the range of 1.5 to 3.5 wt.-%.

Additionally or alternatively, the propylene homopolymer (hPP) has a density in the range of 850 to 1 000 kg/cm$^3$, more preferably in the range of 875 to 950 kg/m$^3$, yet more preferably in the range of 890 to 925 kg/cm$^3$.

In one embodiment, the propylene homopolymer (hPP) has a Charpy notched impact strength at 23° C. ISO 179-1 eA in the range from 0.5 to 10.0 kJ/m$^2$, preferably from 0.6 to 8.0 kJ/m$^2$ and most preferably from 0.8 to 5.0 kJ/m$^2$.

The propylene homopolymer (H-PP) suitable in the inventive composite is available from a wide variety of commercial sources and can be produced as known from the art. For instance, the propylene homopolymer (hPP) can be produced in the presence of a single-site catalyst or a Ziegler-Natta catalyst, the latter being preferred.

The polymerization of the propylene homopolymer (hPP) can be a bulk polymerization, preferably performed in a so-called loop reactor. Alternatively, the polymerization of the propylene homopolymer (hPP) is a two stage or more stage polymerization performed in a combination of a loop reactor operating in slurry phase and one or more gas phase reactors as for instance applied in the Borstar® polypropylene process.

Preferably, in the process for producing the propylene homopolymer (hPP) as defined above the conditions for the bulk reactor of step may be as follows:
the temperature is within the range of 40° C. to 110° C., preferably between 60° C. and 100° C., 70 to 90° C.,
the pressure is within the range of 20 bar to 80 bar, preferably between 30 bar to 60 bar,
hydrogen can be added for controlling the molar mass in a manner known per se.

Subsequently, the reaction mixture from the bulk (bulk) reactor can be transferred to the gas phase reactor, whereby the conditions are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The residence time can vary in both reactor zones. In one embodiment of the process for producing the propylene polymer the residence time in bulk reactor, e.g. loop is in the range 0.5 to 5 hours, e.g. 0.5 to 2 hours and the residence time in gas phase reactor will generally be 1 to 8 hours.

If desired, the polymerization may be effected in a known manner under supercritical conditions in the bulk, preferably loop reactor, and/or as a condensed mode in the gas phase reactor.

As mentioned above, the propylene homopolymer (hPP) is preferably obtained using a Ziegler-Natta system.

Accordingly the process as discussed above is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl based compound. Suitable catalysts are in particular disclosed in U.S. Pat. No. 5,234,879, WO 92/19653, WO 92/19658 and WO 99/33843.

Preferred external donors are the known silane-based donors, such as dicyclopentyl dimethoxy silane, diethylamino triethoxy silane or cyclohexyl methyldimethoxy silane.

If desired the Ziegler-Natta catalyst system is modified by polymerizing a vinyl compound in the presence of the catalyst system, wherein the vinyl compound has the formula:

wherein R³ and R⁴ together form a 5- or 6-membered saturated, unsaturated or aromatic ring or independently represent an alkyl group comprising 1 to 4 carbon atoms. The so modified catalyst is used if desired for the preparation of the propylene homopolymer (hPP) to accomplish α-nucleation of the polymer, the composition (Co) and thus of the total molded article (BNT-technology).

One embodiment of a process for the propylene homopolymer (hPP), as discussed above, is a loop phase process or a loop-gas phase process, such as developed by Borealis, known as Borstar® technology, described for example in EP 0 887 379 A1 and WO 92/12182.

The Glass Fiber (GF) or Carbon Fiber (CF)

The composite of the present invention must comprise a glass fiber (GF) or carbon fiber (CF). It is appreciated that the glass fiber (GF) or carbon fiber (CF) imparts improved impact strength to the composite of the present invention.

Preferably, the glass fiber (GF) or carbon fiber (CF) has a fiber average diameter in the range of 5 to 30 μm. More preferably, the glass fiber (GF) or carbon fiber (CF) has a fiber average diameter in the range of 5 to 25 μm and most preferably in the range of 5 to 20 μm.

For example, the glass fiber (GF) has a fiber average diameter in the range of 5 to 30 μm. More preferably, the glass fiber (GF) has a fiber average diameter in the range of 5 to 25 μm and most preferably in the range of 5 to 20 μm.

Alternatively, the carbon fiber (CF) has a fiber average diameter in the range of 5 to 30 μm. More preferably, the carbon fiber (CF) has a fiber average diameter in the range of 5 to 25 μm and most preferably in the range of 5 to 20 μm.

In one embodiment, the glass fiber (GF) or carbon fiber (CF) has an average fiber length of from 0.1 to 20 mm and most preferably of 0.5 to 20 mm.

For example, the glass fiber (GF) has an average fiber length of from 0.1 to 20 mm and most preferably of 0.5 to 20 mm. Alternatively, the carbon fiber (CF) has an average fiber length of from 0.1 to 20 mm and most preferably of 0.5 to 20 mm.

Glass fibers (GF) being suitable for the present invention are preferably surface treated with a so called sizing agent.

Examples of sizing agents suitable for the glass fibers (GF) include silane sizing agents, titanate sizing agents, aluminum sizing agents, chromium sizing agents, zirconium sizing agents, borane sizing agents, and preferred are silane sizing agents or titanate sizing agents, and more preferably silane sizing. The amount of the sizing agent related to the glass fibers (GF) is within the common knowledge of a skilled person and can be, for example in the range of from 0.1 to 10 parts by weight of the sizing agent with respect to 100 parts by weight of the glass fiber (GF).

In one embodiment, the glass fiber (GF) comprises a sizing agent. Preferably, the sizing agent is a silane sizing agent.

In one embodiment, the carbon fibers (CF) being suitable for the present invention comprise a sizing agent in order to improve its wetting and coupling to the polypropylene base material (PBM). Preferably, the carbon fibers (CF) comprise sizing agents on the surface of the fibers. Preferably, the carbon fibers (CF) comprise a sizing agent selected from epoxy resins, polyether-modified epoxy resins and polyurethane.

In one especially preferred embodiment, the carbon fibers (CF) comprise an epoxy-resin, more preferably a polyether-modified epoxy resin, as sizing agent. A suitable sizing agent is for example Duroxy SEF 968w distributed by Cytec. Film formers, lubricants, stabilizers and antistatic agents may also be comprised in the sizing agent.

Usually the amount of such sizing agent is 15 wt.-% or less, more preferably 10 wt.-% or less, and most preferably 7.5 wt.-% or less, based on the total weight of the carbon fibers (CF).

The surface treatment of the glass fiber (GF) or carbon fiber (CF) with a sizing agent can be done with known methods, like for example immersing the fibers in a tank in which a sizing agent is placed, being nipped and then drying in a hot-air oven, or with a hot roller or a hot plate. In one embodiment, the carbon fiber (CF) are treated by oxidation and/or carbonization, preferably oxidation and carbonization, before applying the sizing agent.

The Polymer-Based Fiber (PF)

The composite of the present invention must comprise a polymer-based fiber (PF) having a melting temperature of ≥210° C.

It is appreciated that the polymer-based fiber (PF) in combination with the glass fiber (GF) or carbon fiber (CF) further improves the impact strength of the composite of the present invention, especially compared to a composite comprising a glass fiber (GF) or carbon fiber (CF) as reinforcing fiber material only.

The term "polymer-based fiber (PF)" in the meaning of the present application refers to a fiber that is not a glass fiber (GF) or carbon fiber (CF). That is to say, the polymer-based fiber (PF) differs from the glass fiber (GF) or carbon fiber (CF). Furthermore, the term "polymer-based fiber (PF)" in the meaning of the present application refers to a fiber that is not a polypropylene, like polypropylene fiber.

It is one specific requirement that the polymer-based fiber (PF) has a melting temperature Tm of ≥210° C. Preferably, the polymer-based fiber (PF) has a melting temperature Tm in the range of 210 to 350° C., more preferably in the range of 210 to 300° C.

Thus, the melting temperature Tm according to ISO 11357-3 of the polymer-based fiber (PF) is ≥42° C., preferably from 42 to 200° C., above the melting temperature Tm according to ISO 11357-3 of the polypropylene base material. More preferably, the melting temperature Tm according to ISO 11357-3 of the polymer-based fiber (PF) is ≥50° C., even more preferably from 50 to 200° C. and most preferably from 50 to 180° C., e.g. from 50 to 120° C., above the melting temperature Tm according to ISO 11357-3 of the polypropylene base material.

In one embodiment, the polymer-based fiber (PF) has an average fiber length of from 0.1 to 20 mm and most preferably of 0.5 to 20 mm.

Additionally or alternatively, the polymer-based fiber (PF) has an average diameter of from 5 to 30 μm, preferably from 5 to 28 μm.

In one embodiment, the polymer-based fiber (CF) has a tenacity of at least 3.0 cN/dtex up to 17 cN/dtex and most preferably of at least 4.0 cN/dtex up to 17 cN/dtex.

Additionally or alternatively, the polymer-based fiber (CF) preferably has a Young Modulus in the range of 3.0 to 35 N/tex and most preferably in the range from 3.0 to 30 N/tex (ISO 5079).

For example, the polymer-based fiber (CF) is selected from a poly vinyl alcohol (PVA) fiber, a polyethylene terephthalate (PET) fiber, a polyamide (PA) fiber and mixtures thereof. Preferably, the polymer-based fiber (CF) is a polyethylene terephthalate (PET) fiber or a poly vinyl alcohol (PVA) fiber. Most preferably, the polymer-based fiber (CF) is a polyethylene terephthalate (PET) fiber.

PVA fibers are well known in the art and are preferably produced by a wet spinning process or a dry spinning process.

PVA itself is synthesized from acetylene [74-86-2] or ethylene [74-85-1] by reaction with acetic acid (and oxygen in the case of ethylene), in the presence of a catalyst such as zinc acetate, to form vinyl acetate [108-05-4] which is then polymerized in methanol. The polymer obtained is subjected to methanolysis with sodium hydroxide, whereby PVA precipitates from the methanol solution.

PVA used for the manufacture of fibers generally has a degree of polymerization of not less than 1 000, preferably not less than 1200 and more preferably not less than 1 500. Most preferably the PVA has a degree of polymerization of around 1 700, e.g. 1 500 up to 2 000. The degree of hydrolysis of the vinyl acetate is generally at least 99 mol %.

The mechanical properties of PVA fibers vary depending on the conditions of fiber manufacture such as spinning process, drawing process, and acetalization conditions, and the manufacture conditions of raw material PVA.

The PVA fibers can be in the form of (multi)filaments or staple fibers.

PVA fibers are characterized by high strength, low elongation, and high modulus. Suitable PVA fibers preferably have a tenacity of from 3.0 cN/dtex to 17.0 cN/dtex, more preferably from 4.0 cN/dtex to 17.0 cN/dtex, even more preferably from 6.0 cN/dtex to to 14.0 cN/dtex and most preferably from 7.0 cN/dtex to 13.0 cN/dtex.

Furthermore, such PVA fibers preferably have a Young Modulus in the range of 3.0 to 35.0 N/tex, preferably in the range of 10.0 to 30.0 N/tex and more preferably in the range of 15.0 to 25.0 N/tex (ISO 5079).

PVA fibers being suitable for the present invention have an an average fiber length of from 0.1 to 20 mm and most preferably of 0.5 to 20 mm.

The fiber average diameter of suitable PVA fibers is in the range of 5 to 30 μm, preferably in the range of 5 to 28 μm, more preferably in the range of 5 to 26 μm, even more preferably in the range of 5 to 24 μm and most preferably in the range of 5 to 22 μm.

In one embodiment, the PVA fibers have a density in the range of 1 100 to 1 400 kg/m$^3$, preferably in the range of 1 200 to 1 400 kg/m$^3$.

PVA fibers being suitable for the present invention are furthermore surface treated with a so called sizing agent. This can be done with known methods, like for example immersing the fibers in a tank in which a sizing agent is placed, being nipped and then drying in a hot-air oven, or with a hot roller or a hot plate.

Example of sizing agents include polyolefin resin, polyurethane resin, polyester resin, acrylic resin, epoxy resin, starch, vegetable oil, modified polyolefin. The amount of the sizing agent related to the polyvinyl alcohol fibers is within the common knowledge of a skilled person and can be, for example in the range of from 0.1 to 10 parts by weight of the sizing agent with respect to 100 parts by weight of the polyvinyl alcohol fiber.

A surface treating agent may be incorporated in the sizing agent to improve the wettability or adhesiveness between the polyvinyl alcohol fibers and the polypropylene composition.

Examples of the surface treating agent include silane coupling agents, titanate coupling agents, aluminum coupling agents, chromium coupling agents, zirconium coupling agents, borane coupling agents, and preferred are silane coupling agents or titanate coupling agents, and more preferably silane coupling agents.

The PET fibers can be in the form of (multi)filaments or staple fibers.

PET fibers are characterized by high strength, low elongation, and high modulus. Suitable PET fibers preferably have a tenacity of from 3.0 cN/dtex to 17.0 cN/dtex, more preferably from 3.0 cN/dtex to 13.0 cN/dtex, even more preferably from 4.0 cN/dtex to 11.0 cN/dtex and most preferably from 5.0 cN/dtex to 9.0 cN/dtex.

Furthermore, such PET fibers preferably have a Young Modulus in the range of 3.0 to 35 N/tex, preferably in the range from 3.0 to 17 N/tex, more preferably in the range of 5.0 to 15 N/tex and most preferably in the range of 6 to 12 N/tex (ISO 5079).

PET fibers being suitable for the present invention have an average fiber length of from 0.1 to 20 mm and most preferably of 0.5 to 20 mm.

The fiber average diameter of suitable PET fibers is in the range of 5 to 30 μm, preferably in the range of 5 to 28 μm, and most preferably in the range of 5 to 26 μm, even more preferably in the range of 5 to 24 μm and most preferably in the range of 5 to 22 μm.

In one embodiment, the PET fibers have a density in the range of 1 100 to 1 400 kg/m$^3$, preferably in the range of 1 200 to 1 400 kg/m$^3$.

The Adhesion Promoter (AP)

To improve compatibility between the polypropylene base material, i.e. the heterophasic propylene copolymer (HECO) or the propylene homopolymer (hPP), and the glass fiber (GF) or carbon fiber (CF) and the polymer-based fiber (PF) an adhesion promoter (AP) can be used.

The adhesion promoter (AP) preferably comprises, more preferably is, a modified (functionalized) polymer and optionally a low molecular weight compound having reactive polar groups.

Modified alpha-olefin polymers, in particular propylene homopolymers and copolymers, like copolymers of ethylene and propylene with each other or with other alpha-olefins, are most preferred, as they are highly compatible with the polymer of the present composite. Modified polyethylene and modified styrene block copolymers, like modified poly(styrene-b-butadiene-b-styrene) (SBS) or poly(styrene-b-(ethylene-cobutylene)-b-styrene) (SEBS), can be used as well.

In terms of structure, the modified polymers are preferably selected from graft or block copolymers.

In this context, preference is given to modified polymers containing groups deriving from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, maleic acid, fumaric acid, itaconic acid and mixtures thereof.

Particular preference is given to maleic anhydride functionalized polypropylene as adhesion promoter (AP).

The amounts of groups deriving from polar groups, e.g. maleic anhydride, in the modified polymer, like the modified polypropylene, are preferably from 0.1 to 5.0 wt.-%, more preferably from 0.2 to 5.0 wt.-%, and most preferably from 0.3 to 4.0 wt.-%, such as from 0.4 to 3.0 wt.-%, based on the total weight of the polar modified polymer.

Particular preference is given to an adhesion promoter (AP) being a modified propylene copolymer or, a modified propylene homopolymer the latter is especially preferred.

In one embodiment the adhesion promoter (AP) is a modified (random) propylene copolymer containing polar groups as defined above. In one specific embodiment the adhesion promoter (AP) is a (random) propylene copolymer grafted with maleic anhydride.

Thus in one specific preferred embodiment the adhesion promoter (AP) is a (random) propylene ethylene copolymer grafted with maleic anhydride, more preferably wherein the ethylene content based on the total amount of the random propylene ethylene copolymer is in the range of 1.0 to 8.0 wt.-%, more preferably in the range of 1.5 to 7.0 wt.-%.

Required amounts of groups deriving from polar groups in the polar modified (random) propylene copolymer or in the modified propylene homopolymer are preferably from 0.1 to 5.0 wt.-%, more preferably from 0.2 to 5.0 wt.-%, and most preferably from 0.3 to 4.0 wt.-%, such as from 0.4 to 3.0 wt.-%, based on the total weight of the polar modified (random) propylene copolymer.

Preferred values of the melt flow rate $MFR_2$ (190° C.; 2.1 kg) measured according to ISO 1133 for the adhesion promoter (AP) are from 1.0 to 500.0 g/10 min, like in the range of 1.0 to 150.0 g/10 min. For example, the melt flow rate $MFR_2$ (190° C.; 2.1 kg) measured according to ISO 1133 for the adhesion promoter (AP) is from 10.0 to 100.0 g/10 min.

The modified polymer, i.e. the adhesion promoter (AP), can be produced in a simple manner by reactive extrusion of the polymer, for example with maleic anhydride in the presence of free radical generators (like organic peroxides), as disclosed for instance in EP 0 572 028.

The adhesion promoter (AP) is known in the art and commercially available. A suitable example is SCONA TSPP 102013 GB or SCONA TPPP 8112 FA of BYK.

The Alpha Nucleating Agent (NU)

According to this invention the alpha nucleating agent (NU) does not belong to the class of additive (A) as defined below.

The composite may contain an alpha nucleating agent (NU). Even more preferred the present invention is free of beta nucleating agents. Accordingly, the alpha nucleating agent (NU) is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, and (iii) salts of diesters of phosphoric acid, e.g. sodium 2,2'-methylenebis (4,6-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer, and (v) mixtures thereof.

Preferably the composite contains as alpha nucleating agent a vinylcycloalkane polymer and/or a vinylalkane polymer. This alpha nucleating agent (NU) is included as described above, namely due to the preparation of the heterophasic propylene copolymer (HECO).

Such additives and nucleating agents are generally commercially available and are described, for example, in "Plastic Additives Handbook", 5th edition, 2001 of Hans Zweifel.

The Additives (A)

The composite of the present invention may comprise additives (A). Typical additives are acid scavengers, antioxidants, colorants, light stabilisers, plasticizers, slip agents, anti-scratch agents, dispersing agents, processing aids, lubricants, and pigments.

Such additives are commercially available and for example described in "Plastic Additives Handbook", $6^{th}$ edition 2009 of Hans Zweifel (pages 1141 to 1190).

Furthermore, the term "additives" according to the present invention also includes carrier materials, in particular polymeric carrier materials (PCM), as defined below.

Preferably the composite does not comprise (a) further polymer(s) different to the polymer(s) comprised in the composite, i.e. the polypropylene base material, the glass fiber (GF) or carbon fiber (CF), the polymer-based fiber (PF) and the optional adhesion promoter (AP), in an amount exceeding 10 wt.-%, preferably exceeding 5 wt.-%, based on the weight of the composite. If an additional polymer is present, such a polymer is typically a polymeric carrier material (PCM) for the additives (A).

It is appreciated that the composite comprises polymeric carrier material (PCM) in an amount of not more than 10.0 wt.-%, preferably in an amount of not more than 5.0 wt.-%, more preferably in an amount of not more than 2.5 wt.-%, like in the range of 1.0 to 10.0 wt.-%, preferably in the range of 1.0 to 5.0 wt.-%, even more preferably in the range of 1.0 to 2.5 wt.-%, based on the total weight of the composite.

The polymeric carrier material (PCM) is a carrier polymer for the additives (A) to ensure a uniform distribution in the composite. The polymeric carrier material (PCM) is not limited to a particular polymer. The polymeric carrier material (PCM) may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

According to a preferred embodiment the polymeric carrier material (PCM) is a polypropylene homopolymer.

The Process

According to another aspect, the present invention is directed to a process for the preparation of a composite as defined herein, comprising the steps of:

a) providing a polypropylene base material as defined herein, b) providing a glass fiber (GF) or carbon fiber (CF) as defined herein in form of a continuous fiber, c) providing a polymer-based fiber (PF) as defined herein in form of a continuous fiber, d) impregnating and coating the fiber of step b) with the polypropylene base material of step a) such as to obtain a fiber reinforced polypropylene base material, e) impregnating and coating the polymer-based fiber (PF) of step c) with the polypropylene base material of step a) such as to obtain a polymer-based fiber reinforced polypropylene base material, and f) optionally injection molding the composition obtained by blending the fiber reinforced polypropylene base material of step d) and the polymer-based fiber reinforced polypropylene base material obtained of step e), wherein process steps d) and e) are carried out simultaneously or separately in any order.

With regard to the definition of the polypropylene base material (PBM), the glass fiber (GF) or carbon fiber (CF), the polymer-based fiber (PF) and preferred embodiments thereof, reference is further made to the statements provided above when discussing the technical details of the composite of the present invention.

Thus, in one embodiment the composite comprising
a) 25 to 92.5 wt.-%, based on the total weight of the composite, of a polypropylene base material having a melt flow rate MFR$_2$ (230° C., 2.16 kg) measured according to ISO 1133 in the range of from 3.0 to 140.0 g/10 min, wherein the polypropylene base material is
  i) a heterophasic propylene copolymer (HECO) comprising a (semicrystalline) polypropylene (PP) as a matrix in which an elastomeric propylene copolymer (EC) is dispersed; or
  ii) a propylene homopolymer (hPP); and
b) 5 to 50 wt.-%, based on the total weight of the composite, of a glass fiber (GF) or carbon fiber (CF); and
c) 2.5 to 25 wt.-%, based on the total weight of the composite, of a polymer-based fiber (PF) having a melting temperature of ≥210° C.,
wherein the weight ratio of the glass fiber (GF) or carbon fiber (CF) to the polymer-based fiber (PF) [(GF) or (CF)/(PF)] is at least 2:1;
is obtainable by a process comprising the steps of:
a) providing a polypropylene base material,
b) providing a glass fiber (GF) or carbon fiber (CF) in form of a continuous fiber,
c) providing a polymer-based fiber (PF) in form of a continuous fiber,
d) impregnating and coating the fiber of step b) with the polypropylene base material of step a) such as to obtain a fiber reinforced polypropylene base material,
e) impregnating and coating the polymer-based fiber (PF) of step c) with the polypropylene base material of step a) such as to obtain a polymer-based fiber reinforced polypropylene base material, and
f) optionally injection molding the composition obtained by blending the fiber reinforced polypropylene base material of step d) and the polymer-based fiber reinforced polypropylene base material obtained of step e),
wherein process steps d) and e) are carried out simultaneously or separately in any order.

It is preferred that process steps d) and e) are carried out by pultrusion. In particular, it is to be noted that process steps d) and e) can be carried out by any pultrusion process well known and commonly used in the composite art. For example, process steps d) and e) are carried out in a pultrusion process with a temperature profile between 140 and 210° C.

Preferably, process step d) is carried out in that the glass fiber (GF) or carbon fiber (CF) is impregnated with the polypropylene base material (PBM) in a pultrusion process and then the obtained strands are cut in a pelletiser to specific lengths.

Preferably, process step e) is carried out in that the polymer-based fiber (PF) is impregnated with the polypropylene base material (PBM) in a pultrusion process and then the obtained strands are cut in a pelletiser to specific lengths.

The pultrusion in process steps d) and e) has the advantage that the fibers are typically arranged parallel in the pellets obtained in process steps d) and e), preferably all fibers in the pellets obtained in process steps d) and e) are of the same length.

In order to obtain a composite having an exceptional good impact strength, it is required that the glass fiber (GF) or carbon fiber (CF) of step b) is provided in a continuous form, e.g. in the shape of an endless roving. Additionally, it is required that the polymer-based fiber (PF) of step c) is provided in a continuous form, e.g. in the shape of an endless roving.

Preferably, in impregnating step d) the glass fiber (GF) or carbon fiber (CF) in continuous form, e.g, in the shape of an endless roving, is impregnated with the polypropylene base material (PBM) thereby forming a strand of fiber reinforced polypropylene base material and subsequently cutting the strand into pellets.

It is appreciated that the provision of the glass fiber (GF) or carbon fiber (CF) in continuous form, e.g., in the shape of an endless roving, in impregnating step d) has the advantage that pellets are obtained having a fiber content of from 5 to 60 wt.-% and where the pellets—in a cross-sectional view—have a twolayer-structure, preferably a core-sheath-structure, where the inner layer is comprised of the glass fiber (GF) or carbon fiber (CF) being impregnated with the polypropylene base material (PBM).

Additionally, in impregnating step e) the polymer-based fiber (PF) in continuous form, e.g, in the shape of an endless roving, is impregnated with the polypropylene base material (PBM) thereby forming a strand of polymer-based fiber reinforced polypropylene base material and subsequently cutting the strand into pellets.

It is appreciated that the provision of the polymer-based fiber (PF) in continuous form, e.g, in the shape of an endless roving, in impregnating step e) has the advantage that pellets are obtained having a fiber content of from 2.5 to 50 wt.-% and where the pellets—in a cross-sectional view—have a twolayer-structure, preferably a core-sheath-structure, where the inner layer is comprised of the polymer-based fiber (PF) being impregnated with the polypropylene base material (PBM).

In one embodiment, the pellets obtained in process steps d) and e) preferably have an average length of from 2 to 20 mm, more preferably of 2.5 to 20 mm and most preferably from 3.5 to 20 mm. It is appreciated that the length of the pellets may correspond to the length of the glass fiber (GF) or carbon fiber (CF) and polymer-based fiber (PF) in the pellets obtained in process steps d) and e).

For example, the glass fiber (GF) or carbon fiber (CF) in the pellets have an average fiber length of from 0.1 to 20 mm, preferably from 0.5 to 20 mm, more preferably from 2 to 20 mm, even more preferably from 2.5 to 20 mm and most preferably from 3.5 to 20 mm. Additionally, the polymer-based fibers (PF) in the pellets have an average fiber length of from 0.1 to 20 mm, preferably of 0.5 to 20 mm, more preferably from 2 to 20 mm, even more preferably from 2.5 to 20 mm and most preferably from 3.5 to 20 mm.

It is appreciated that the average fiber length of the glass fiber (GF) or carbon fiber (CF) and polymer-based fiber (PF) in the final composite may differ from the average fiber length obtained in process steps d) and e).

Additionally or alternatively, the glass fibers (GF) or carbon fibers (CF) in the pellets obtained in process step e) have an aspect ratio in the range of 100.0 to 2 000.0. Additionally, the polymer-based fibers (PF) in the pellets obtained in process step e) have an aspect ratio in the range of 100.0 to 2 000.0.

Thus, in process step d) a fiber reinforced polypropylene base material is obtained, preferably in form of pellets. In process step e) a polymer-based fiber reinforced polypropylene base material is obtained, preferably in form of pellets.

In view of the above, it is appreciated that process steps d) and e) can be carried out simultaneously or separately in any order.

In one embodiment, process steps d) and e) are carried out separately in any order.

If process steps d) and e) are carried out separately in any order, the fiber reinforced polypropylene base material obtained in step d), preferably in form of pellets, and the polymer-based fiber reinforced polypropylene base material obtained in step e), preferably in form of pellets, are blended such as to obtain a blend of the fiber reinforced polypropylene base material and the polymer-based fiber reinforced polypropylene base material. In particular, it is to be noted that the blending can be carried out by any blending method well known and commonly used in the art, e.g. in a mixer or extruder.

For example, the fiber reinforced polypropylene base material obtained in step d), preferably in form of pellets, and the polymer-based fiber reinforced polypropylene base material obtained in step e), preferably in form of pellets, are blended by dry-blending. In particular, it is to be noted that the dry-blending can be carried out by any dry-blending method well known and commonly used in the art, e.g. in a mixer or extruder. It is appreciated that the dry-blending of the fiber reinforced polypropylene base material with the polymer-based fiber reinforced polypropylene base material is carried out before injection molding step f).

It is appreciated that if process steps d) and e) are carried out separately the blend of the fiber reinforced polypropylene base material and the polymer-based fiber reinforced polypropylene base material is subjected to process step f).

Thus, in one embodiment process steps d) and e) are carried out separately and the blending of the fiber reinforced polypropylene base material of step d) and the polymer-based fiber reinforced polypropylene base material of step e) is carried out by dry-blending before step f).

Alternatively, process steps d) and e) are carried out simultaneously.

In this embodiment, the glass fiber (GF) or carbon fiber (CF) in continuous form, e.g, in the shape of an endless roving, and the polymer-based fiber (PF) in continuous form, e.g, in the shape of an endless roving, are combined and the combined fibers are impregnated together with the polypropylene base material (PBM) thereby forming a strand of fiber and polymer-based fiber reinforced polypropylene base material and subsequently cutting the strand into pellets. In this embodiment, the pellets obtained—in a cross-sectional view—have a twolayer-structure, preferably a core-sheath-structure, where the inner layer is comprised of the glass fiber (GF) or carbon fiber (CF) and the polymer-based fiber (PF) being impregnated with the polypropylene base material (PBM).

The pellets comprising the combined fibers are optionally subjected to injection molding step f). For example, the pellets comprising the combined fibers are subjected to injection molding step f). Alternatively, the process of the present invention is carried out without injection molding step f).

In particular, it is to be noted that injection molding step f), if present, can be carried out by any injection molding method well known and commonly used in the art, e.g. in an injection molding machine. For example, process step f) is carried out at a temperature between 140 and 200° C., preferably between 170 and 200° C.

The Article/the Use

The composite of the present invention is preferably used for the production of molded articles, preferably injection molded articles. Even more preferred is the use for the production of parts of washing machines or dishwashers as well as automotive articles, especially of car interiors and exteriors, like bumpers, side trims, step assists, body panels, spoilers, dashboards, interior trims and the like.

The current invention also provides articles, like injection molded articles, comprising, preferably comprising at least 60 wt.-%, more preferably at least 80 wt.-%, yet more preferably at least 95 wt.-%, like consisting of, the inventive composite. Accordingly, the present invention is especially directed to parts of washing machines or dishwashers as well as to automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive composite.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the comonomer content of the polymers. Quantitative $^{13}$C {$^1$H} NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}$C {$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C$ {$^1H$} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol\ \%]=100*fE$$

The weight percent comonomer incorporation was calculated from the mole fraction:

$$E[wt\ \%]=100*(fE*28.06)/((fE*28.06)+(1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

DSC analysis, melting temperature ($T_m$) and heat of fusion ($H_f$), crystallization temperature ($T_c$) and heat of crystallization ($H_c$): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step.

Density is measured according to ISO 1183-1—method A (2004). Sample preparation is done by compression molding in accordance with ISO 1872-2:2007.

$MFR_2$ (230° C.) is measured according to ISO 1133 (230° C., 2.16 kg load).

$MFR_2$ (190° C.) is measured according to ISO 1133 (190° C., 5 kg or 2.1 kg load).

The xylene cold solubles (XCS, wt.-%): Content of xylene cold solubles (XCS) is determined at 25° C. according to ISO 16152; first edition; 2005Jul, 1

The amorphous content (AM) is measured by separating the above xylene cold soluble fraction (XCS) and precipitating the amorphous part with acetone. The precipitate was filtered and dried in a vacuum oven at 90° C.

$$AM\ \% = \frac{100*m1*v0}{m0*v1}$$

wherein
"AM %" is the amorphous fraction,
"m0" is initial polymer amount (g)
"m1" is weight of precipitate (g)
"v0" is initial volume (ml)
"v1" is volume of analyzed sample (ml)

Intrinsic viscosity is measured according to DIN ISO 1628/1, October 1999 (in Decalin at 135° C.).

Charpy notched impact strength is determined according to ISO 179/1 eA at 23° C. and at −20° C. by using injection moulded test specimens of 80×10×4 mm³ prepared in accordance with EN ISO 19069-2.

Charpy unnotched impact strength is determined according to ISO 179/1 eU at 23° C. by using injection moulded test specimens of 80×10×4 mm³ prepared in accordance with EN ISO 19069-2.

Tensile Modulus is measured according to ISO 527-2 (cross head speed=1 mm/min; 23° C.) using injection molded specimens as described in EN ISO 1873-2 (dog bone shape, 4 mm thickness).

Elongation at yield is measured according to ISO 527-2 (cross head speed=50 mm/min; 23° C.) using injection molded specimens as described in EN ISO 1873-2 (dog bone shape, 4 mm thickness).

Tensile strength is measured according to ISO 527-2 (cross head speed=50 mm/min; 23° C.) using injection molded specimens as described in EN ISO 1873-2 (dog bone shape, 4 mm thickness).

Elongation at break is measured according to ISO 527-2 (cross head speed=50 mm/min; 23° C.) using injection molded specimens as described in EN ISO 1873-2 (dog bone shape, 4 mm thickness).

Average fiber diameter, average fiber length and aspect ratio: Pellets obtained from pultrusion were embedded in Struers CaldoFix resin under vacuum. For determining the average fiber diameter, the polished cross sections of these pellets were determined. Abrasion/polishing was performed on a Struers LaboPol-5 machine, employing grinding media with particle sizes down to 0.04 µm. The samples thus prepared were analyzed using an Olympus optical microscope in brightfield mode. The dimensions of the fiber cross-sections of the fibers in the matrix were measured to get the average fiber-diameter (typically around 30 individual fibers were measured and the shortest dimension of the fiber cross-section was used to get the fiber diameter).

In contrast, the average fiber length was determined by X-ray computed tomography (XCT). For the generation of XCT data a sub-μm CT nanotom (GE phoenix x-ray nanotom 180NF, Wunstorf, Germany) was used. The tube was operated at 70 kV to obtain enough contrast. The voxel size was $(2\ \mu m)^3$, the measured volume was $(5\times2\times3\ mm)^3$ of a sample of injection moulded specimen as described in EN ISO 1873-2 (dog bone shape, 4 mm thickness). The XCT data were processed by various algorithmic steps to ascertain the three-dimensional structure of the sample. The fibre length distribution was derived from the XCT data and the weighted mean average of the fibre length distribution was taken as the average fibre length. The aspect ratio can be calculated from the average fiber diameter and length.

2. Examples

Composites were prepared using the components in the amounts as indicated in table 1 below and as explained further below. Pellets of the Masterbatch1, Masterbatch2, Masterbatch3, and Masterbatch4 were prepared by impregnating the endless fibers in a pultrusion process. The impregnating was carried out at a temperature not exceeding 210° C.

of 74.5 cN/dtex, elongation at break 13%, with a specific surface-treatment for PP, supplied by Durafiber Technologies, Germany.

"LGF" is the commercial endless glass fiber Tufrov 4599, 1200 tex, of PPG Industries having an average diameter of 17 μm and a silane sizing agent for glass.

"LCF" is the commercial endless carbon fiber Panex 35 continuous tow of Zoltek, having an average diameter of 7.2 μm, tensile strength of 4.137 MPa, tensile modulus of 242 GPa and a density of 1.81 g/cc.

"AP" is an ethylene polypropylene copolymer functionalized with maleic anhydride having a $MFR_2$ (190° C.) of more than 80 g/10 min and a maleic anhydride content of 1.4 wt.-%

"NIS" is the notched impact strength.

The Masterbatches1 to 4 were dry-blended for preparing inventive examples IE1, IE2, IE4 and IE5 as outlined in table 2a. IE3, CE2 and CE3 were directly prepared by impregnating the given fibers in a pultrusion process. The impregnating was carried out at a temperature of about 210° C. Comparative example CE1 is the commercial sample GB215HP of *Borealis* comprising 22 wt.-% glass fibers. Injection molding of the inventive and comparative examples was carried out on a Battenfeld HM 1300/350 injection molding machine. The composition of the comparative and inventive composites and their characteristics are indicated in table 2b below.

TABLE 1

Examples

| Example | | Masterbatch1 (PP-LPETF) | Masterbatch2 (PP-LPETF) | Masterbatch3 (PP-LGF) | Masterbatch4 (PP-LCF) |
|---|---|---|---|---|---|
| hPP | [wt.-%] | 75.1 | 62.3 | 71.2 | 66.3 |
| LPETF | [wt.-%] | 24.9 | 37.7 | — | — |
| LGF | [wt.-%] | — | — | 27.0 | — |
| LCF | [wt.-%] | — | — | — | 27.0 |
| AP | [wt.-%] | — | — | 1.8 | 6.8 |
| Density | [kg/m³] | 990 | 1040 | 1080 | 1040 |
| Tensile modulus | [MPa] | 2254 | 2470 | 6367 | 12100 |
| Tensile strength | [MPa] | 51.5 | 47.4 | 109.2 | 79.6 |
| Tensile Elongation at yield | [%] | 24.4 | 22.5 | 2.6 | 0.8 |
| Tensile Elongation at break | [%] | 25.7 | 23.5 | 2.6 | 0.8 |
| NIS (23° C.) | [kJ/m²] | 70.6 | 94.6 | 24.8 | 10.5 |

"hPP" is the commercial polypropylene homopolymer "HJ120UB" containing nucleating and antistatic additives, provided by *Borealis*. This polymer is a CR (controlled rheology) grade with narrow molecular weight distribution, density of 905 kg/m³ (ISO1183) and an $MFR_2$ of 75 g/10 min (230° C.; 2.16 kg; ISO 1133); XCS of 2.2 wt.-% and melting temperature of 164° C. and a Charpy Notched Impact Strength at 23° C. of 1.0 kJ/m².

"LPETF" is the commercial endless PET multifilament yarn on bobbins PES 11000 f2000 Type 715, tenacity TABLE 2a Examples

| Example | | IE1 | IE2 | IE4 | IE5 |
|---|---|---|---|---|---|
| Masterbatch1 | [wt.-%] | | 25.0 | | 25.0 |
| Masterbatch2 | [wt.-%] | 25.0 | | 25.0 | |
| Masterbatch3 | [wt.-%] | 75.0 | 75.0 | | |
| Masterbatch4 | [wt.-%] | | | 75.0 | 75.0 |

TABLE 2b

Composition and characteristics

| Example | | CE1 | CE2 | CE3 | IE1 | IE2 | IE3 | IE4 | IE5 |
|---|---|---|---|---|---|---|---|---|---|
| hPP | [wt.-%] | | 78.0 | 75.0 | 69.0 | 72.2 | 69.0 | 65.3 | 68.5 |
| LPETF | [wt.-%] | | | | 9.43 | 6.23 | 10.0 | 9.43 | 6.23 |
| LGF | [wt.-%] | | 20.0 | | 20.3 | 20.3 | 20.0 | | |
| LCF | [wt.-%] | | | 20.0 | | | | 20.3 | 20.3 |
| AP | [wt.-%] | | 2.0 | 5.0 | 1.35 | 1.35 | 1.1 | 5.06 | 5.06 |
| Density | [kg/m$^3$] | 1030 | 1020 | 990 | 1070 | 1040 | 1080 | 1050 | 1040 |
| Tensile modulus | [MPa] | 4330 | 5001 | 9023 | 5017 | 4689 | 4733 | 5750 | 6080 |
| Tensile strength | [MPa] | 73.5 | 93.9 | 73.8 | 83.2 | 82 | 77 | 50.1 | 52.5 |
| Tensile Elongation at yield | [%] | 2.5 | 2.8 | 1.0 | 2.4 | 2.6 | 2.4 | 1.2 | 1.0 |
| Tensile Elongation at break | [%] | 2.5 | 2.9 | 1.0 | 2.4 | 2.6 | 2.5 | 1.3 | 1.0 |
| NIS (23° C.) | [kJ/m$^2$] | 15.1 | 17.0 | 6.9 | 37.7 | 30.1 | 39.1 | 26.6 | 20.3 |

From table 2b, it can be gathered that the inventive examples exhibit an improved mechanical property profile and especially and improved impact strength.

The invention claimed is:

1. Composite comprising:
   a) 50 to 91.0 wt %, based on the total weight of the composite, of a polypropylene base material having a melt flow rate MFR$_2$ (230° C., 2.16 kg) measured according to ISO 1133 in the range of from 3.0 to 140.0 g/10 min, wherein the polypropylene base material is
      i) a heterophasic propylene copolymer (HECO) comprising a semicrystalline polypropylene (PP) as a matrix in which an elastomeric propylene copolymer (EC) is dispersed or
      ii) a propylene homopolymer (hPP); and
   b) 8.6 to 45.0 wt %, based on the total weight of the composite, of a glass fiber (GF) or carbon fiber (CF); and
   c) 2.5 to 20 wt %, based on the total weight of the composite, of a polymer-based fiber (PF) having a melting temperature of ≥210° C., wherein the polymer-based fiber (PF) also has a fiber average diameter in the range of 5 to 30 μm, a tenacity of from 3.0 cN/dtex, or both; and
   d) 0.1 to 7.0 wt %, based on the total weight of the composite, of an adhesion promoter (AP), where the adhesion promoter is a maleic anhydride functionalized polypropylene,
   wherein the weight ratio of the glass fiber (GF) or carbon fiber (CF) to the polymer-based fiber (PF) [(GF) or (CF)/(PF)] is at least 2:1.

2. Composite according to claim 1, wherein the heterophasic propylene copolymer (HECO) has
   a) a melt flow rate MFR$_2$ (230° C., 2.16 kg) in the range of from 5.0 to 120.0 g/10 min, and/or
   b) a xylene cold soluble (XCS) fraction (25° C.) of from 15.0 to 50.0 wt %, based on the total weight of the heterophasic propylene copolymer (HECO), and/or
   c) a comonomer content of ≤30.0 mol %, based on the heterophasic propylene copolymer (HECO).

3. Composite according to claim 1, wherein an amorphous fraction (AM) of the heterophasic propylene copolymer (HECO) has
   a) a comonomer content in the range of 30.0 to 60.0 mol %, based on the amorphous fraction (AM) of the heterophasic propylene copolymer (HECO), and/or
   b) an intrinsic viscosity (IV) in the range of 1.8 to 4.0 dl/g.

4. Composite according to claim 1, wherein the propylene homopolymer (hPP) has:
   a) a melt flow rate MFR$_2$ (230° C., 2.16 kg) in the range of from 5.0 to 120.0 g/10 min, and/or
   b) a melting temperature measured according to ISO 11357-3 of at least 150° C., and/or
   c) a xylene cold soluble (XCS) content based on the total weight of the propylene homopolymer (hPP).

5. Composite according to claim 1, wherein the glass fiber (GF) or carbon fiber (CF) has a fiber average diameter in the range of 5 to 30 μm and/or an average fiber length from 0.1 to 20 mm.

6. Composite according to claim 1, wherein the glass fiber (GF) or carbon fiber (CF) comprises a sizing agent.

7. Composite according to claim 1, wherein the polymer-based fiber (PF) is selected from the group consisting of a poly vinyl alcohol (PVA) fiber, a polyethylene terephthalate (PET) fiber, a polyamide (PA) fiber and mixtures thereof.

8. Composite according to claim 1, wherein the polymer-based fiber (PF) also has
   an average fiber length of 0.1 to 20 mm.

9. Composite according to claim 1, wherein the melting temperature Tm according to ISO 11357-3 of the polymer-based fiber (PF) is ≥40° C. above the melting temperature Tm according to ISO 11357-3 of the polypropylene base material.

10. Molded article comprising the composite according to claim 1.

11. Molded article according to claim 10, wherein the molded article is an automotive article.

* * * * *